United States Patent [19]
Felton et al.

[11] 3,990,565
[45] Nov. 9, 1976

[54] REMOTE CONTROL BIFURCATED TYPEWRITER KEYBOARD (UNIVERSAL INPUT MATRIX SWITCH)

[76] Inventors: Warren Felton, Deptford, N.J.; George Spector, New York, N.Y. (both c/o George Spector, 3615 Woolworth Bldg., 233 Broadway, New York, N.Y.)

[22] Filed: Aug. 14, 1974

[21] Appl. No.: 497,186

[52] U.S. Cl. .................. 197/98; 197/1 R; 197/45; 197/182; 197/186 A
[51] Int. Cl.² ..................................... B41J 5/08
[58] Field of Search ............ 35/5, 6; 197/1 R, 5, 197/12, 13 A, 14, 19, 45, 98, 100, 144, 149, 176, 182, 186 A, 73, 154, 155; 235/145 R

[56] References Cited
UNITED STATES PATENTS

| | | | |
|---|---|---|---|
| 955,224 | 4/1910 | Taylor | 197/182 |
| 1,138,474 | 5/1915 | Heidner | 197/100 |
| 3,068,985 | 12/1962 | Arthur | 197/14 |
| 3,738,472 | 6/1973 | Willcox | 197/176 X |
| 3,830,352 | 8/1974 | Kolpek | 197/19 X |

*Primary Examiner*—Pinkham Richard C.
*Assistant Examiner*—Vance Y. Hum

[57] ABSTRACT

A new design of typewriter in which the keyboard is divided into two components, and which are adjustably movable away from the remainder of the typewriter, so that they may be positioned on either sides of papers placed directly in front of a typist, and from which she is copying text to be typed, each divided keyboard being operated by one of the typist's hands, and the typewriter including any one of various methods to magnify the text that is typed upon a paper so that the typist, some distance away from the typewriter clearly sees the same as typed, without straining her eyes.

2 Claims, 10 Drawing Figures

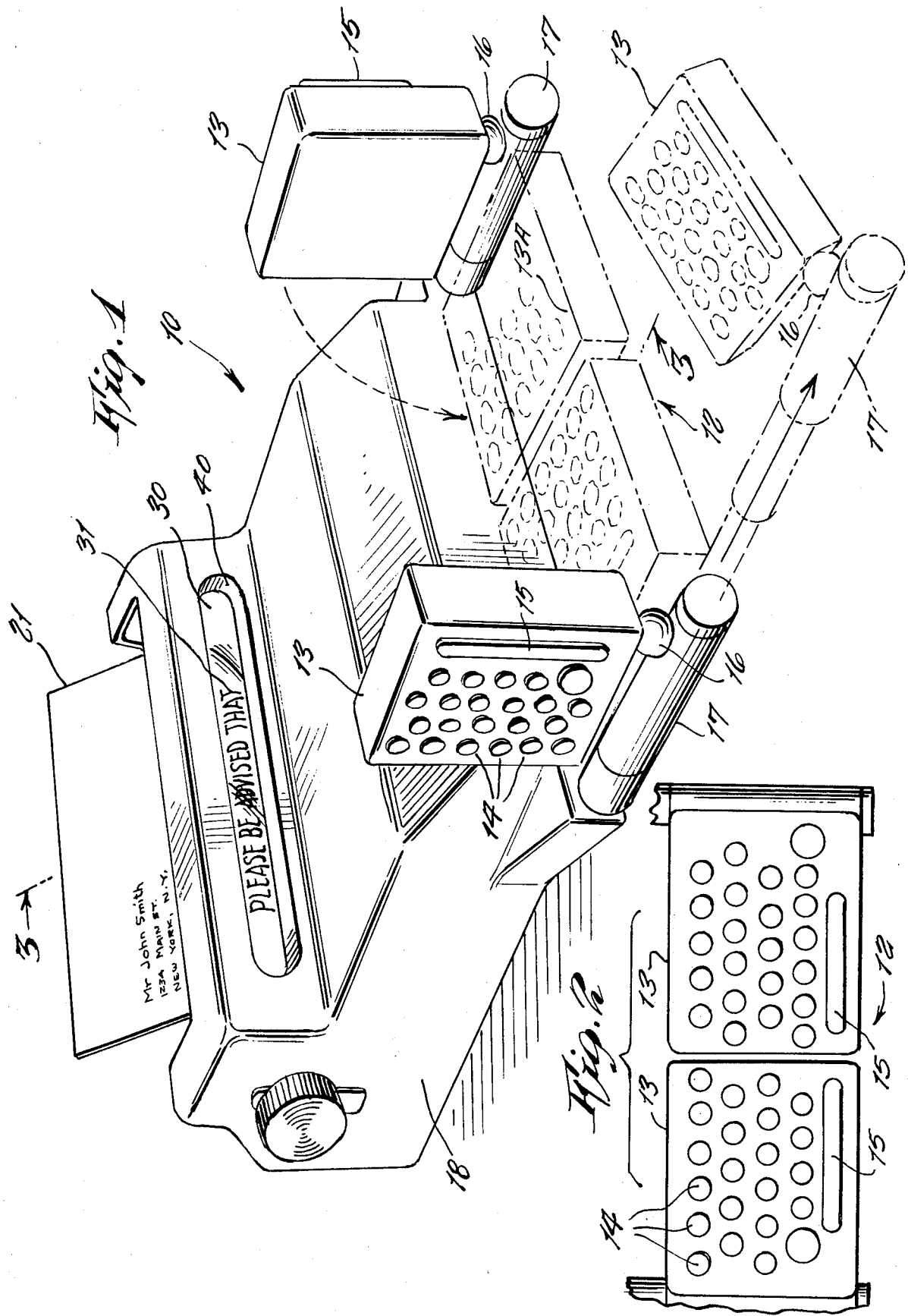

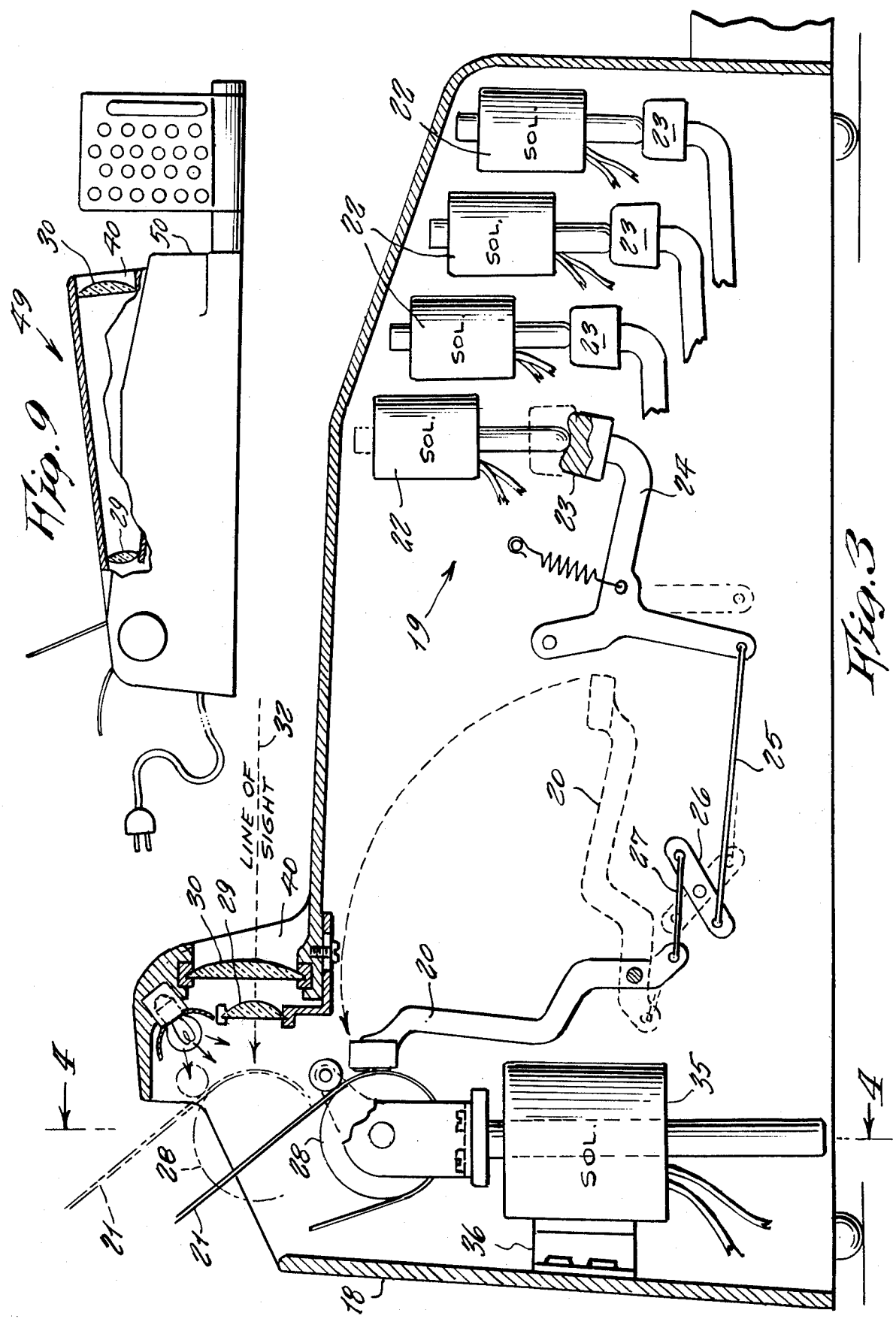

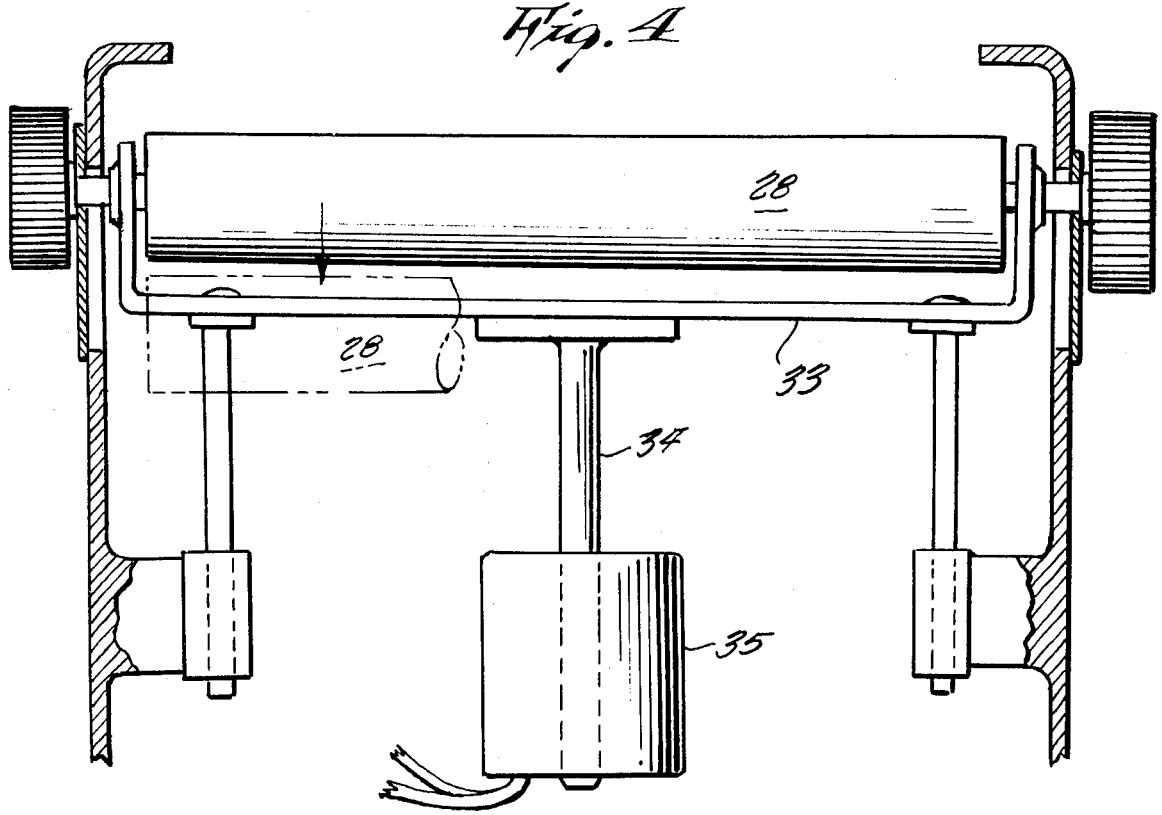
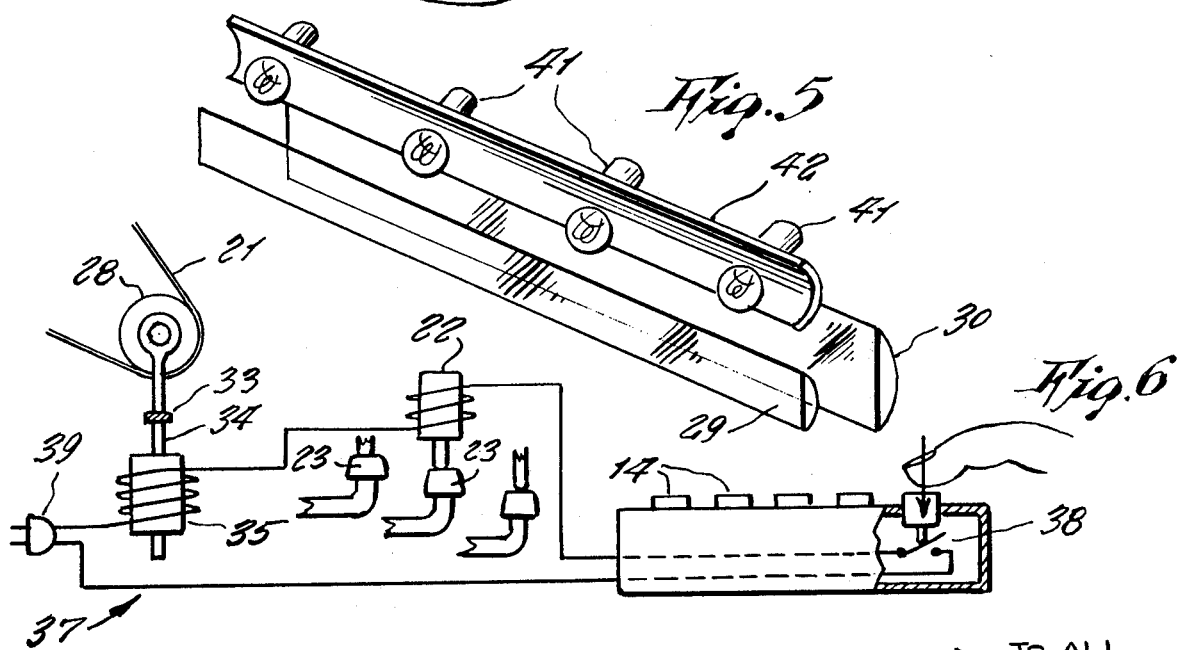
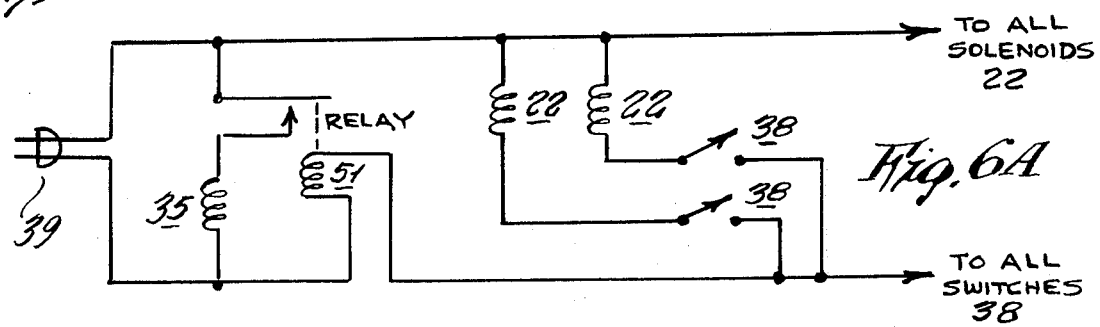

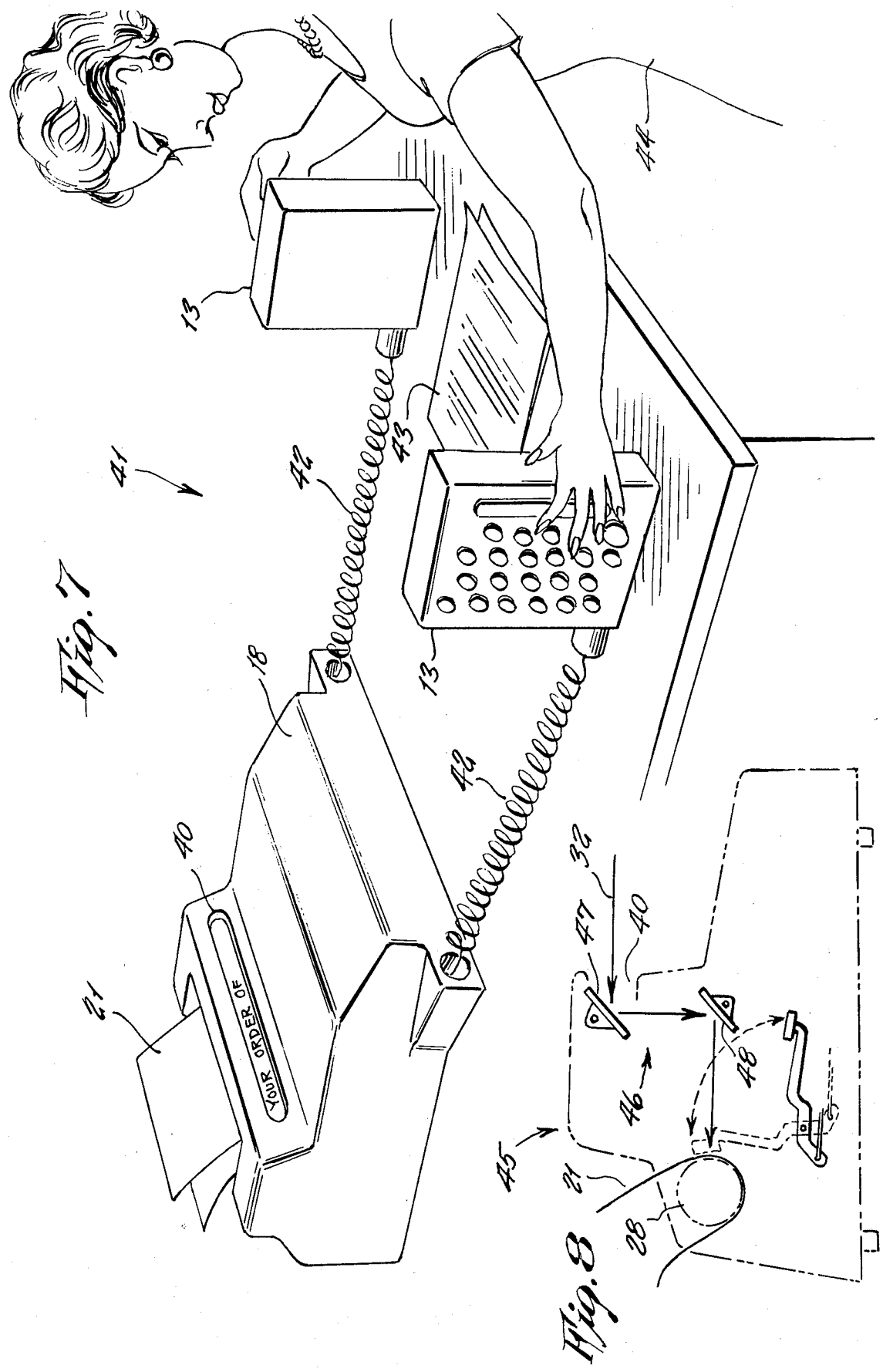

REMOTE CONTROL BIFURCATED TYPEWRITER KEYBOARD (UNIVERSAL INPUT MATRIX SWITCH)

This invention relates generally to typewriters.

A principal object of the present invention is to provide a new design of typewriter, which permits a typist to have directly in front of her the text or other material from which she is copying so that it is easier to follow.

Another object is to provide a typewriter in which the keyboard is accordingly bifurcated into two units, and the units are positioned on left and right sides of the papers that are being copied so that each unit is comfortably located so to be operated by one of her hands.

Another object is to provide a bifurcated keyboard typewriter in which the keyboard units are adjustably movable away from the remainder of the typewriter so that the typewriter can be located beyond the papers that are placed in front of the typists, thus allowing plenty of space for such papers, and wherein accordingly the text that is typed on a paper placed into the typewriter is magnified so that the typist, some distance away therefrom, can clearly read the same without eye strain.

Other objects are to provide a bifurcated keyboard typewriter which is simple in design, inexpensive to manufacture, rugged in construction, easy to use and efficient in operation.

These and other objects will be readily evident upon a study of the following specification and the accompanying drawing wherein:

FIG. 1 is a perspective view of one form of the present invention wherein the divided keyboard is telescopically adjustable forwardly and each keyboard unit is universally adjustable in position.

FIG. 2 is a face view of the keyboard units.

FIG. 3 is a side cross sectional view taken on line 3—3 of FIG. 1.

FIG. 4 is a cross sectional view taken on line 4—4 of FIG. 3.

FIG. 5 is a perspective view of the typed text illumination and magnification means shown in FIG. 3.

FIG. 6 is an electrical diagram of the invention shown in FIGS. 1 to 5. FIG. 6A shows further features of electrical system.

FIG. 7 is a perspective view of a modified form of the invention wherein the keyboard units are cable connected to the typewriter for reason of greater freedom in positioning.

FIG. 8 is a further modified design in which a periscopic construction is employed in viewing the text that is being typed.

FIG. 9 is a side view, partly in cross section of a further modified form of the invention in which the magnified image of the text being typed is brought closer to the typist by being at a front end of the typewriter.

Referring now to the drawing in detail, and more particularly to FIGS. 1 through 6 thereof at this time, the reference numeral 10 represents an electric, articulated typewriter having a bifurcated keyboard 12 according to the present invention, wherein the keyboard is divided into two units 13 each one of which is designed to be operated by one hand of a typist. Each unit accordingly includes such buttons 14 that are normally associated for being operated by the particular hand so that a typist acquainted with a conventional keyboard immediately feels at home and does not need to relearn anything. Each unit also includes a space bar 15 as such is normally operated by both hands in a conventional keyboard.

Each unit 13 is pivotable in any direction about a universal joint 16 which is mounted on an outer end of a telescopic arm 17 which at its other end is secured to the frame of the typewriter body 18. Accordingly, each unit can be used either in a conventional horizontal location as shown by dotted lines 13a in FIG. 1 or they can be up ended as shown by the solid lines in FIG. 1. Alternately they can be additionally extended more forwardly in either or any other position by pulling out the telescopic arms. Electric wire cables extend through the arms between the buttons and an operating mechanism 19 for activating keys 20 for striking letters on a paper 21.

The mechanism 19 in the present invention includes a plurality of solenoids 22 each one of which is located to operate one of the plurality of buttons 23 that are positioned in the conventional location of buttons touched by a typist in ordinary typewriters so that in the present invention for conventional design is utilized in the mechanism 19 wherein each button 23 activates conventional linkages 24, 25, 26 and 27 so to swing the key 20 up against paper 21 rolled around the typewriter roller 28.

In view that the typewriter of the present invention is located further away from a typist, a means are provided so she can easily see the text being typed on the paper 28. This comprises the use of magnifying lens 29 and 30 so to enlarge the text as shown at 31 in FIG. 1, so a typist can read the same without eye strain.

Due to the solenoids 22 necessitating the foreward portion of the typewriter body to be higher, the line of sight 32 to see the text 31 must likewise be raised over the foreward portion of the typewriter body.

Accordingly, in this invention, the typed paper must necessarily be raised so to be brought into the line of sight. This is accomplished by roller 28 being supported on a U-shaped frame 33 mounted upon armature 34 of a solenoid 35 stationarily mounted on bracket 36 secured on the body 18, as shown in FIGS. 3 and 4.

An electric circuit 37 is provided for each button, as shown in FIG. 6; each circuit including one of the solenoids 22, the solenoid 35, a switch 38 depressible by button 14, and a connection to a power source such as a plug 39; the circuit being in series. The current sensing relay 51 of FIG. 6A properly controls power to each key switch 38.

Thus whenever the button is depressed, the circuit is closed with the power source so to activate solenoid 22 in order to strike the key 20, and also to activate solenoid 35 so to lower the roller 28 whereby the key 20 can strike the paper 21. Immediately after striking the key, the circuit is broken, and the roller 28 is lifted to its resting position wherein the typed text is now visible behind lens 29 and 30 fitted within window 40 so it can be read.

A row of electric lamps 41 with reflector 42 serve to illuminate the typed text as shown in FIGS. 3 and 5.

It is now evident that in use, with units 13A in horizontal position, the typist can operate the buttons 14 by "hunt and peck" typing while observing the papers in front of her, and she can check the typed results by looking into the window 40 where the typing is shown magnified for easy reading from a distance.

In FIG. 7 a modified form 41 of the invention incorporates collapsible coiled cables 42 instead telescopic arms 17 between the units 13 and typewriter body 18. The Figure shows the papers 43 directly in front of typist 44 and from which she is copying. The units 13 are vertically disposed on each side of the paper, and each hand operates each unit 13 in conventional fashion as in FIG. 1. The units 13 may be used in vertical position as shown, or horizontally for possible hunt and peck system.

In FIG. 8, another modified design 45 of the invention includes a periscope 46 so to raise the typed image to the observation window 40; the periscope including mirrors 47 and 48. This construction replaces the above described solenoid structure 35.

In FIG. 9, another modified design 49 incorporates lens 29 and 30 being spread far apart so that the lens 30 are brought more closely to the typist for additionally easier reading, and wherein the lens 30 is accordingly greatly increased in size so that the typed text seen therethrough appears very large. The window 40 and lens 30 are close to the end 50 of the typewriter body.

Thus several modified designs of the invention have been provided.

While various changes may be made in the detail construction, it is understood that such changes will be within the spirit and scope of the present invention as is defined by the appended claims.

What is claimed is:

1. An articulated typewriter having a body containing a printing mechanism in combination with a bifurcated keyboard disposed externally relative to the said body; including means operatively connecting the keyboard and the printing mechanism electrically for operating the printing mechanism from the keyboard, wherein the printing mechanism includes a plurality of lever linkages, each terminating in a printing head, further including a series of solenoid operators, wherein each lever linkage is actuated by an associated solenoid operator to cause the printing head to move to its printing position, said keyboard comprising two units each having a set of buttons, wherein each set corresponds to the buttons normally actuated by a person's left and right hand, said buttons coacting with said means to energize selectively each solenoid operator, wherein, each keyboard unit is used to energize respective selected solenoid operators, wherein, each keyboard unit is universally adjustable relative to the body, including an optical system mounted in said body and wherein the printing mechanism includes a printing roller mounted in the body, said system focusing on the portion of the roller being instantly used to receive printing from the head and transmitting a magnified view of the typed material to the operator of the keyboard units, wherein the keyboard units include a pair of similar brackets mounted on a front end of the body in spaced relationship symmetrical relative to the central axis of the body, said bracket being axially extensible and including a universal joint for rotating the unit about axis both normal and parallel to the longitudinal axis of the bracket whereby the units can assume horizontally adjacent positions and vertically adjacent positions, wherein the roller is mounted on a carrier vertically adjustable relative to the body further including a solenoid actuated mover in engagement with said carrier, said mover being actuated by said means when each said button is operated causing lowering of the rollers as the printing head is activated to printing position.

2. A typewriter as in claim 1 wherein the optical system includes a lens mounted at the rear of the body adjacent the roller and an aligned parallel lens at the front of the body for directing the view of the printed matter closer to the operator.

* * * * *